US007028594B1

(12) United States Patent
Mentken

(10) Patent No.: US 7,028,594 B1
(45) Date of Patent: Apr. 18, 2006

(54) SPLIT RING AND PELLET METHOD STITCHLESS FASTENER COIL SEPARATION TOOL

(76) Inventor: Robert Mentken, 51 East 97th St. (4A), New York, NY (US) 10029

( * ) Notice: Subject to any disclaimer, the term of this patent is extended or adjusted under 35 U.S.C. 154(b) by 36 days.

(21) Appl. No.: 10/395,514

(22) Filed: Mar. 24, 2003

Related U.S. Application Data

(60) Provisional application No. 60/367,036, filed on Mar. 23, 2002.

(51) Int. Cl.
*B23P 19/04* (2006.01)
*A45F 3/02* (2006.01)

(52) U.S. Cl. .......................... 81/488; 81/15.9; 29/225; 224/614

(58) Field of Classification Search ................. 81/488, 81/15.9; 29/215, 227, 229, 230, 243.56, 29/243–256, 225; 224/614

See application file for complete search history.

(56) References Cited

U.S. PATENT DOCUMENTS

| | | | | | |
|---|---|---|---|---|---|
| 1,361,548 | A | * | 12/1920 | Rinn, Jr. | 29/228 |
| 4,543,860 | A | * | 10/1985 | Van Meter | 81/488 |
| 5,373,717 | A | * | 12/1994 | Gore et al. | 70/456 R |
| 5,392,504 | A | * | 2/1995 | Calusinski | 29/426.6 |
| 5,421,073 | A | * | 6/1995 | Johnson et al. | 29/228 |
| 5,957,354 | A | | 9/1999 | Mentken | |

* cited by examiner

*Primary Examiner*—Lee D. Wilson
*Assistant Examiner*—Alvin J. Grant
(74) *Attorney, Agent, or Firm*—Edward Callahan

(57) ABSTRACT

A guidance channel radiating from each side of clip holding chamber centered on a flat plate. A prying tool slideably and rotatably held within each guidance channel by a spring strip. A split ring held snugly within the holding chamber. The tool tips are forced between the split ring coils, which are separated further by simultaneous rotation of the prying tool handles 90-degrees in opposite clock directions. A pellet placed inside folded bag material forms a bump. The material with bump is placed between the separated coils into the split ring interior. Reverse 90-degree handle rotation partly closes the coils around the bump. Withdrawing the prying tools completely allows the coils to fully close, capturing the pellet-containing material. Tool stops prevent the tool tips from entering the split ring interior too far into or away from the clip holding chamber. Suspension of the tool and bags facilitates production.

21 Claims, 5 Drawing Sheets

Fig. 21
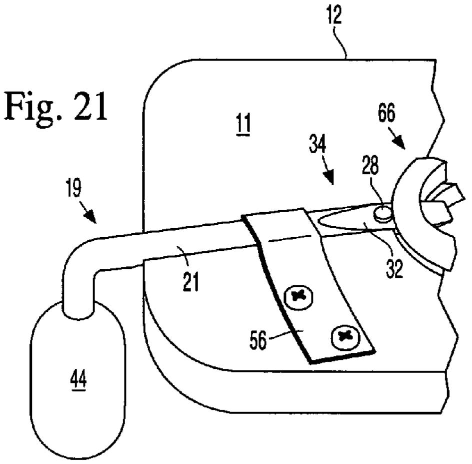
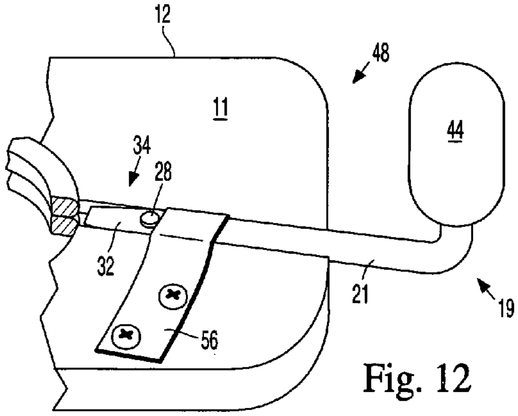
Fig. 12
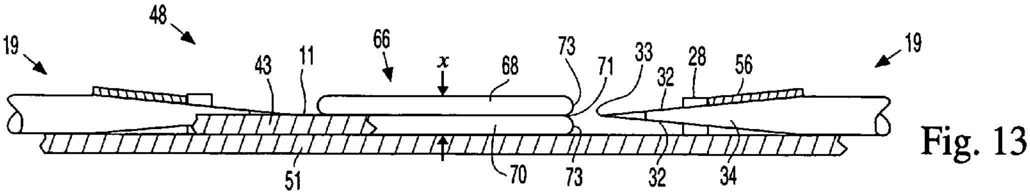
Fig. 13
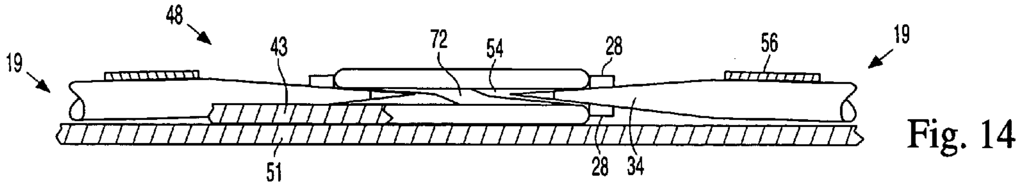
Fig. 14
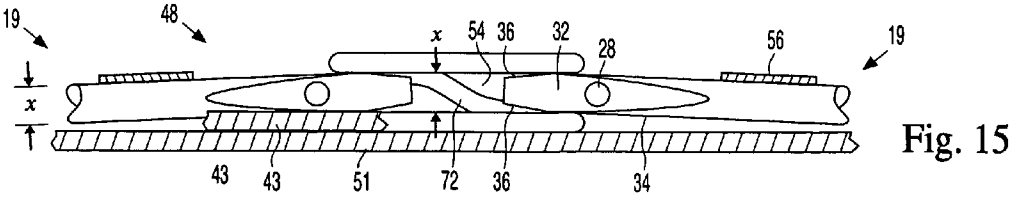
Fig. 15

SPLIT RING AND PELLET METHOD STITCHLESS FASTENER COIL SEPARATION TOOL

CROSS-REFERENCE TO RELATED APPLICATIONS

This application claims the benefit of PPA Ser. No. 60/367,036 filed 2002 Mar. 23 by the present inventor

BACKGROUND

1. Field of Invention

This invention relates to split ring coil separating tools, and particularly to improvements to applicant's coil separating tool and method as disclosed in his U.S. Pat. No. 5,957,354 issued Sep. 28, 1999.

2. Prior Art

Applicant's issued patent (FIG. 2, split ring spring clip 66, and FIGS. 4*a*, 4*b*, 4*c*, 4*d*, 4*e*, 4*f*, tool 34) discloses a stitchless fastener which is constructed and operates as follows: a pellet is placed inside a folded high strength material, which creates a bump. Once the coils are separated, the folded bump sandwich is inserted between the coils and into the interior periphery of a split ring (like a key ring) whose coils are so powerful they can only be parted with a prying tool. Tool withdrawal permits the coils to close, thereby trapping the pellet-containing material inside the split ring. The high tensile force generated in use can pull the bump created by the pellet no further than against the coils interior periphery because their powerful resistance to separation prevents escape of the pellet-containing high-strength material from between the coils.

Although the applicant's issued patent discloses the use of two tools for prying the coils apart in the Specification (col. 20, lines 49–51), it is obvious that only one operator's hand is free to hold a tool (not shown) since the other hand must be free to hold a split ring. No provision is made for holding the split ring in a fixed position so that both operators' hands can be occupied with the coil-prying tools. What is more, any attempted use of a conventional holding tool, such as a vise, to stabilize the split ring merely prevents coil separation and/or blocks access into the coils interior via between the coils.

Neither is there any means disclosed in the applicant's issued patent for the split rings to be firmly held in place while the operator overcomes the powerful resistance of the coils to separation from attempted entrance of the tool tips between them. Nor is there any resistance to attempted tool withdrawal from the coils' powerful grip (see Operation below).

Furthermore, nothing in the applicant's issued patent discloses what anti-rotational stabilizing force opposes the operators ¼ turn rotating action after the tool tips have been inserted between the coils. Without such opposition, rotating the tips merely rotates the clip along with the tips as a whole, without any coil separation occurring.

Since there is nothing to guide the tool tips into its correct position, the time that it takes an operator to position the tool tips exactly where necessary prior to insertion between the coils is relatively lengthy because the operator must hunt for the correct position each time. Lack of guidance of the tool tips towards their destination between the coils contributes immensely to undesirably long production cycle times.

There is also nothing to guide the bag corner bumps on its way into its correct position between the coils. The time that it takes an operator to position the bag corner exactly where necessary prior to insertion between the coils is relatively lengthy because the operator must hunt for the correct position each time. Lack of such guidance also means undesirably long production cycle times.

After completion of a loading cycle and withdrawal of the tool tips from between the coils, there is no provision for stopping the tool tips from traveling too far away and holding them in position just outside of the coils in order to be ready for the next loading cycle.

Using two unguided prying tools, uneven and asymmetrical tool tip insertion causes the separation distance between the opposing coils to be non-uniform across the width of the split ring, which interferes with ease of insertion of the bag corner bump.

Due to the tremendous force of their coils, without positively controlling them at the time of prying them apart, the split rings are unstable and dangerous. They can easily and suddenly snap out of position, go flying violently and cause operator injury, or at the least, damage the bag material;

Unlike the disclosure of FIG. **4*e*, reference number 28 of applicant's issued patent, in actual practice, the tool tip—after bag corner bump 28** is in its clamped position, but prior to the tool's withdrawal—makes contact with the bag corner, causing it damage.

Objects & Advantages

Accordingly, it would be desirable for a coil-separating tool to:

- enable both operators' hands to be free and available for tool and bag handling;
- efficiently guide both tool tips towards their correct insertion points at the split ring coils;
- efficiently guide pellet-loaded bag corners towards their insertion points between separated split ring coils;
- hold the split ring steady while an operator
  - forces the tool tips between the coils;
  - rotates the coil-separating tools ¼ turn in opposition to the holding force,
  - rotates the tools ¼ turn back to its pre-load position, and
  - withdraws the tool tips from between the coils;
- force coils open uniformly across the entire width of the split ring;
- separate the split ring coils without the tool tips occupying the space reserved for the bag corners;
- keep the split rings stable and safe while performing its specified tasks, and
- be withdrawn without damaging the clamped bag corner part with its pellet contents;
- freely release the split ring with its captured bag corner as a unit, and
- remain in position to efficiently accept the next assembly cycle.

Further objects and advantages of my invention will become apparent from a consideration of the drawings and ensuing description.

BRIEF SUMMARY OF THE INVENTION

A split ring is placed into and held stationary in the holding compartment at the center of a flat plate. A pair of L-shaped prying tools with round shafts and screw driver-like tips are controlled by a pair of guidance channels which point their prying tips at the parting groove defined by the top and bottom coils of the split ring. A spring strip attached to the flat plate keeps each tool snugly within its guidance channel and its tip aligned with the parting groove by pressing against a flat portion of the tool shafts. The prying tools are free to slide a limited distance along their guidance channels and rotate around their own axis. Their handles overhang the flat plate at each end. The operator pushes on the backs of both handles simultaneously, sending the tool tips between the coils, parting them slightly. The tool tips are prevented from traveling too far into the split ring's interior by either of two alternative stopping means: The first is a collar affixed to the tool shaft which fits partway into a box-shaped widened portion of the guidance channels whose front and rear walls limit the tools' travel in both directions along the guidance channels. The other stopping means is a rivet or pin affixed to the flat portion of the tool tips at a predetermined distance from the tip ends. The rivet or pins' contact with the coils prevents the tips from entering too far into the split ring's interior. In the other direction, the rivet or pins' contact with the spring strips stops the tools. Utilizing the leverage of the L-shaped handles to overcome the power of the coils, the operator rotates them 90-degrees, simultaneously, in opposite clock directions thereby separating the coils a distance equal to the width of the tool tips. The operator now places a bag corner bump between the separated coils and into a portion of the split ring interior unoccupied by the tips. The operator then reverses the handle rotation, which partially closes the coils around the bag corner bump, then pulls the prying tools out from between the coils, away from the holding compartment, which allows the coils to close completely, thereby capturing the bag corner bumps. Now the bag corner and its attached split ring can be lifted out of the clip holding compartment as a unit. Cantilevered suspension of the coil-spreading tool above a work surface with a bracket facilitates bag handling in production.

BRIEF DESCRIPTION OF DRAWING FIGURES

Figure 3:
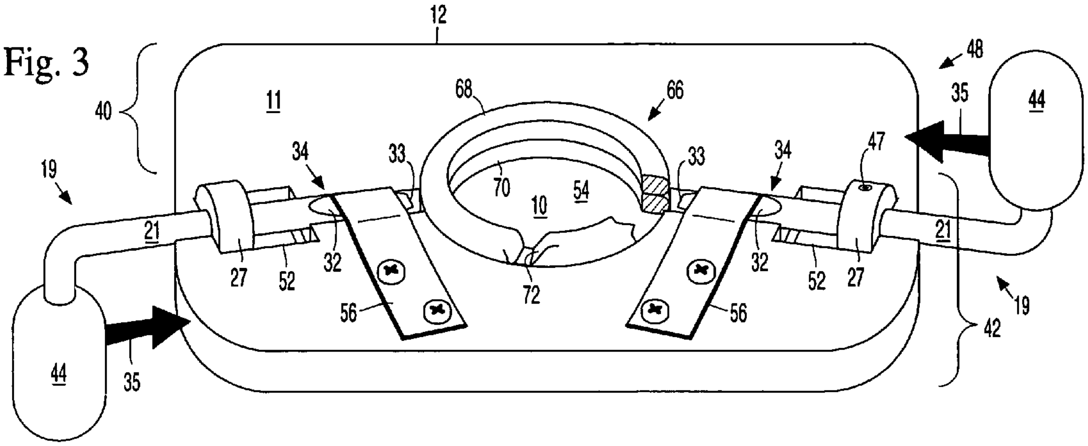
FIG. 3 shows a rear perspective view of the stop box/stop collar first embodiment of a coil separating tool in its first sequential position; the tips of the prying tools are poised outside of, and a split ring is already loaded inside the clip holding compartment. The one piece solid cast, molded, or fabricated version is shown, as in FIG. 1.
Figure 4:
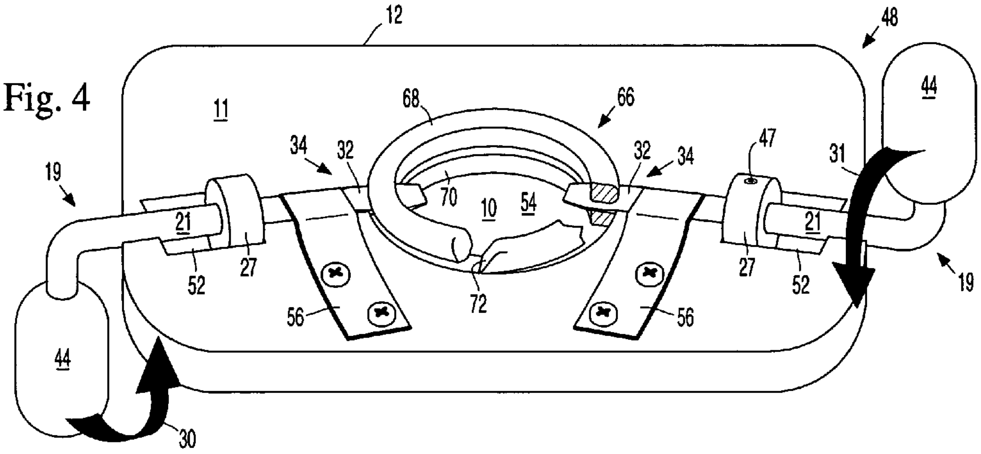

FIG. 4 continues the sequence from FIG. 3. The coil-separating tool is in its second position; the tips of the prying tools have entered between the coils and into the periphery of the split ring, which has partially separated coils and a locked-in split ring inside clip holding compartment.

Figure 5:
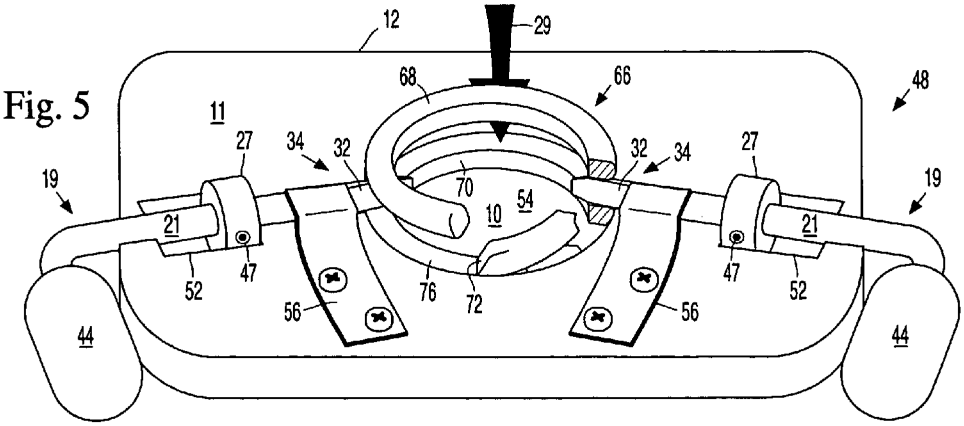

FIG. 5 continues the sequence from FIG. 4. The coil-separating tool is in its third position; each prying tool has been rotated 90-degrees, which has fully separated the split ring coils.

Figure 6:
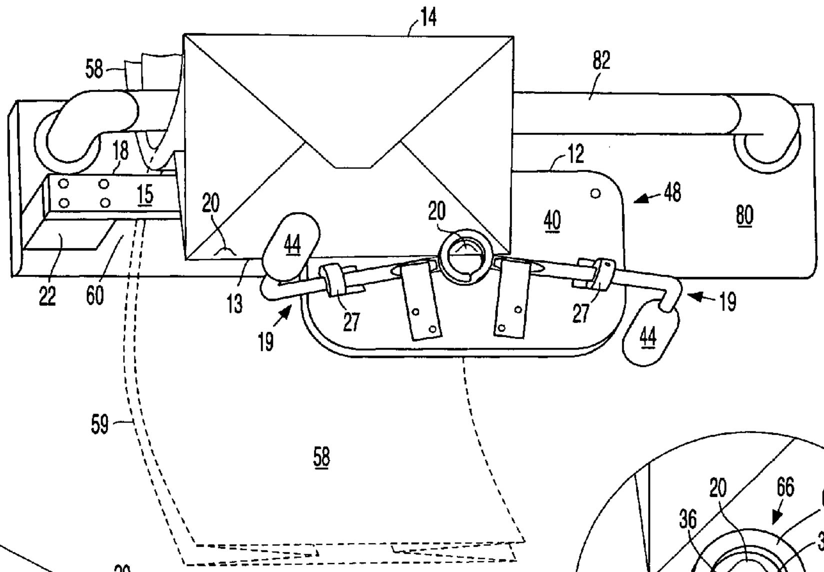

FIG. 6 shows an overhead perspective view of a coil-separating tool suspended above a work table or base by a suspension bracket. A split ring is attached to the right corner bump of the bag edge. The Prying tools are withdrawn from between the coils and are again in position 1. The handle that's over the bag is pointing up; the other handle that's not over the bag is pointing down.

Figure 6A:
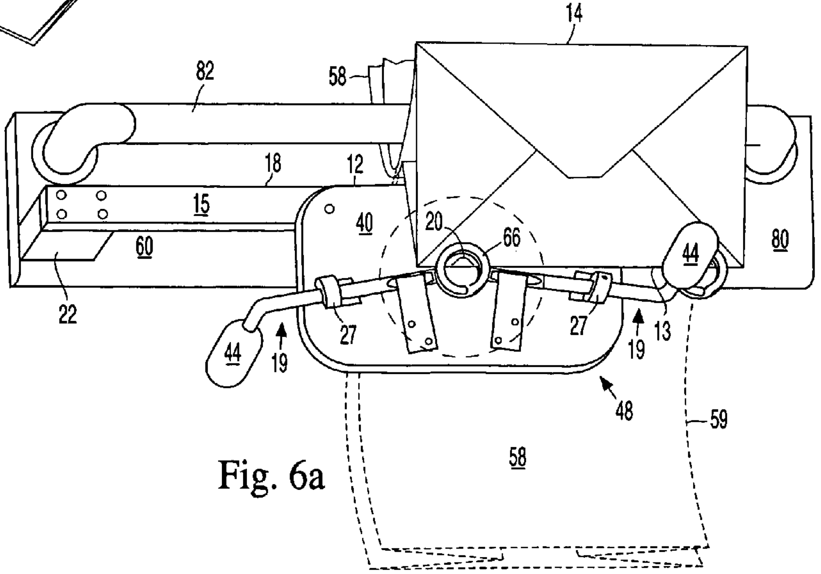

FIG. 6*a* is the same as FIG. 6 except a second split ring is attached to the left corner of the same bag. The handle directions are now reversed.

Figure 7:
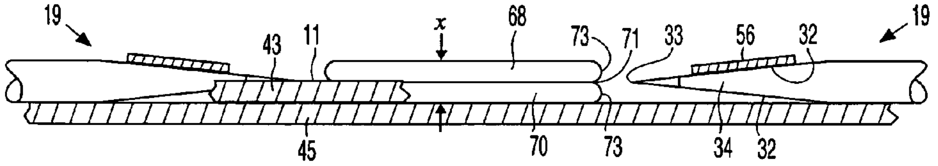

FIG. 7 shows an elevation close up view, part breakaway/part section, of the first embodiment (stop box/stop collar not shown) of coil-separating tool 48. Its prying tool tips are in their first position. The tool comprises two layers, wherein the top layer thickness is equal to the height of the split ring bottom coil (½ the split ring height).

Figure 8:
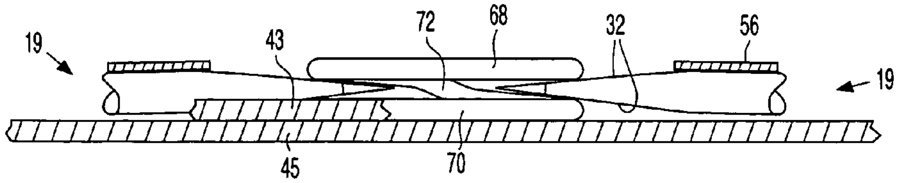

FIG. 8 is the same as FIG. 7 except the prying tools are in their second position wherein the coils are partially separated.

Figure 9:
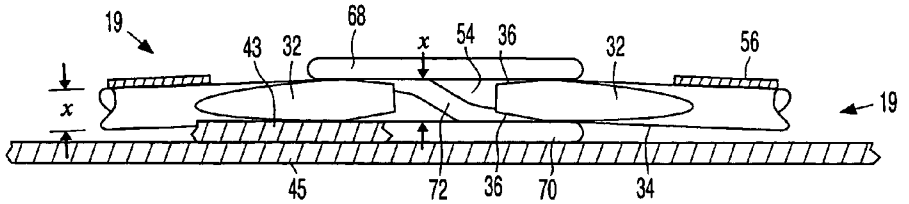

FIG. 9 is the same as FIG. 7 except the prying tools are in their third position wherein the coils are fully separated.

Figure 10:
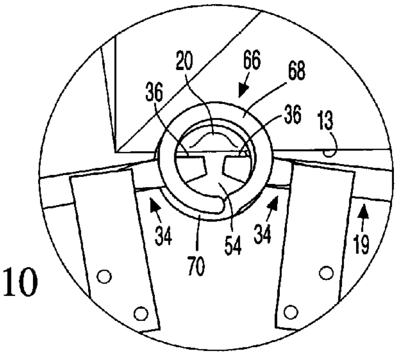

FIG. 10 shows a rear perspective close-up view designated by the dashed line circle in FIG. 6*a*, except the prying tools tips are still between the coils prior to their withdrawal. This figure shows how the corner angles of the tips avoid contact with the bag edge.

Figure 11:
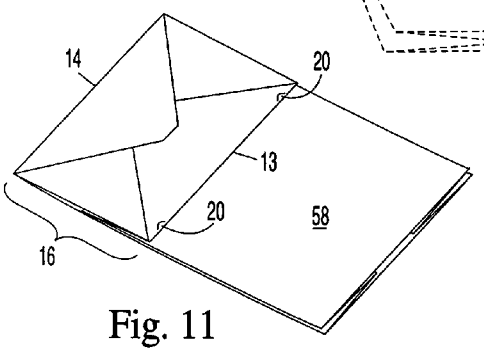

FIG. 11 shows how the clip attachment edge of the bottom panel of the preferred bag embodiment is typically manufactured to be on the same plane with its rear major upper portion.

FIG. 12 shows a rear overhead perspective breakaway view of the right side only of a solid cast, molded, or fabricated version of the second embodiment of the coil separating tool. It uses rivets or pins and its spring strips and split rings as stops in its first and second positions.

FIG. 13 shows an elevation, part breakaway/part section close up view of the second embodiment of the coil separating tool with its prying tools in their first position, as in FIG. 12, except both sides are shown.

FIG. 14 is the same view as FIG. 13 except the Prying Tools are shown in their second position (coils partially separated), also as in FIG. 21.

FIG. 15 is the same view as FIG. 13 except the Prying Tools are shown in their third position (coils fully separated).

Figure 19:
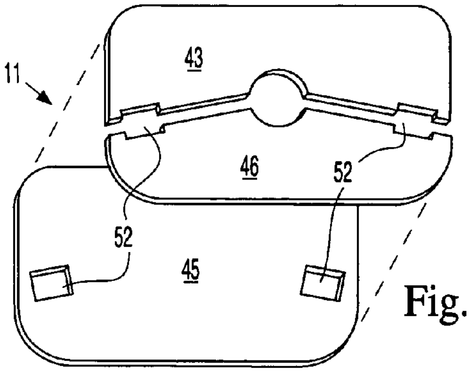

FIG. 19 shows an overhead exploded view of the two-layered version of the coil-separating tool first embodiment that has stop boxes.

Figure 20:
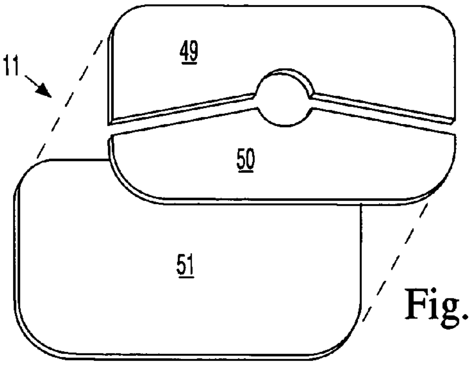

FIG. 20 shows an overhead exploded view of the two-layered version of the coil-separating tool second embodiment that has no stop boxes.

FIG. 21 shows a rear overhead perspective breakaway view of the left side only of a solid cast, molded, or fabricated version of the second embodiment of the coil separating tool, the same embodiment as FIG. 12. It is in the same second position as FIG. 14.

Figure 22:
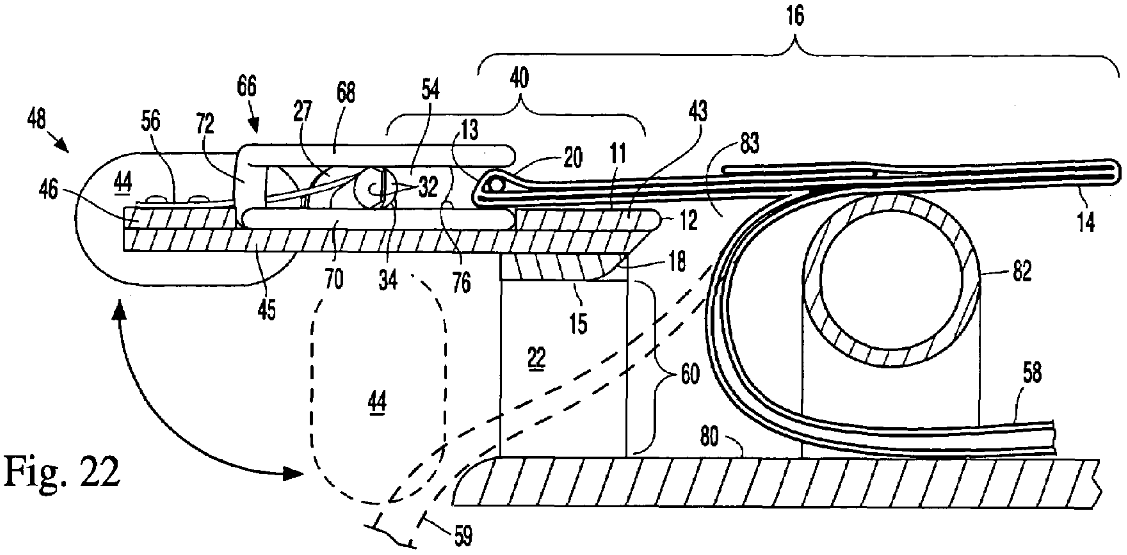

FIG. 22 shows side elevation, part breakaway, and part section view of the coil-separating tool suspended above a work table or base by a suspension bracket. The split ring coils are fully separated. The bag corner bump is entering the space between the coils, while the rear portion of the bag is being supported by a suspended tube. The space under the coil-separating tool (or support tube) provides clearance for the major upper portion of the bag, which can dwell forward, under the tool (broken lines), or rearward (solid lines) under the tube, while the split rings are being attached.

Figure 23:
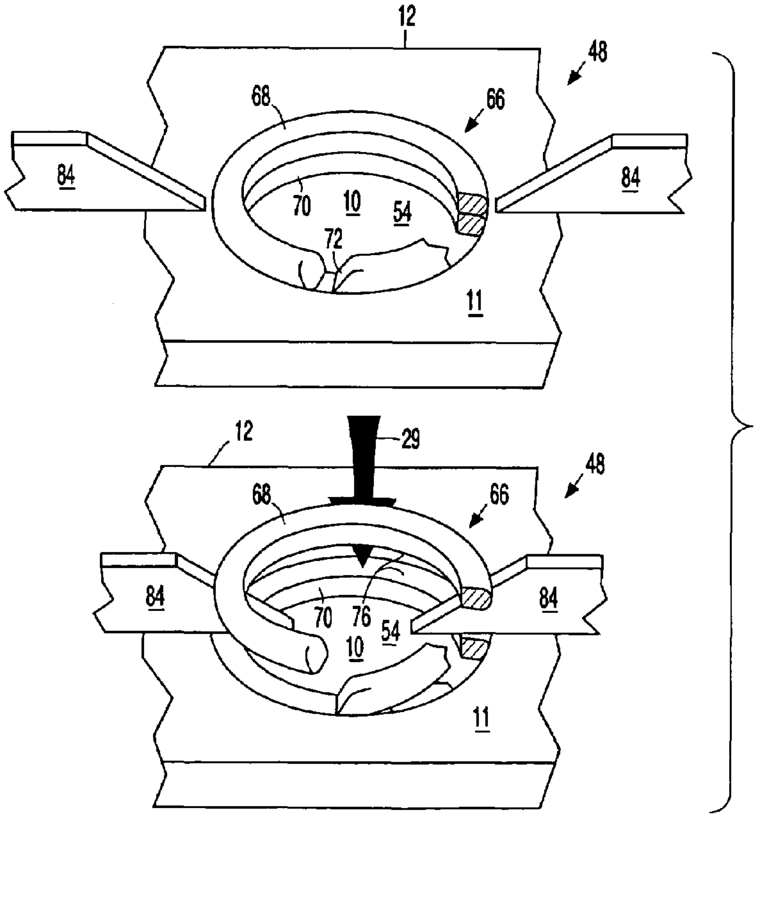

FIG. 23 shoes sequentially how steel wedges are used as an alternate coil separation tool.

DETAILED DESCRIPTION OF THE INVENTION

Each coil-spreading tool comprises a:

flat plate 11 of an appropriate material and size, which can be molded, cast, or fabricated in one piece (FIGS. 1, 2), or it can be layered sheet materials (FIGS. 19, 20). In the layered embodiment, the top layer 43, 46, 49, 50 thickness is equal to the bottom coil 70 thickness (½ the split ring 66 height. See Guidance Channels 17 below and FIGS. 7, 13, 22). The floor plates 45, 51 can be any appropriate thickness;

clip holding compartment 10 recessed into and centered on flat plate 11, its floor recessed a distance equal to the thickness of bottom coil 70 of split ring 66 when placed therein. Split Ring 66 (in this embodiment, round, 1 inch OD) should fit snugly in clip holding compartment 10;

front platform area (FIG. 3, bracket 40) surrounds the front half of clip holding compartment 10, is flat and serves to guide bag corner 20 (FIGS. 6, 6*a*, 10, 22) with its bumps into its destination at the 12 o'clock position between the coils (FIG. 5, arrow 29, and FIG. 22) of split ring 66, once they are separated. Flat surface 11 of front platform area 40 is advantageously aligned with parting groove 71 (FIGS. 7, 13, 22) of split ring 66.

Figure 1:
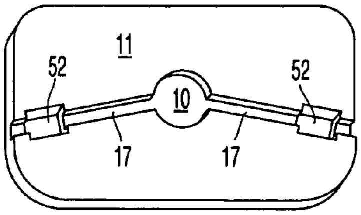
FIG. 1 shows a rear overhead perspective view of the solid cast, molded, or fabricated version of the first embodiment of the coil-separating tool. In this embodiment, each guidance channel has a stop box.
Figure 2:
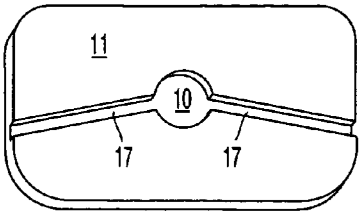
FIG. 2 shows a rear overhead perspective view of the solid cast, molded, or fabricated version of the second embodiment of the coil-separating tool in which there are no stop boxes on the guidance channels.

After coil separation (FIG. 22), front platform area 40 remains aligned with gripping surface 76 of bottom coil 70. Forward edge 12 (FIGS. 6, 6*a*, 22) of front platform area 40, including forward edge 18 of suspension bracket 15, should be sized and shaped to fit into wedge-shaped bag space 83 formed by the leading half of gusset width 16 and bag major upper portion 58 behind bag clip attachment edge 13 (see cantilever suspension bracket 15 below). Accordingly, front platform area 40 must be shorter than ½ the bag gusset width 16 (FIG. 11) or corner bumps 20 with leading edge 13 cannot reach their destination inside the coils of split ring 68;

rear platform area 42 (FIGS. 3, 4, 5) begins where front platform area 40 ends, and comprises;

guidance channels 17 (FIGS. 1, 2), a pair, located one on each side and opening into clip holding compartment 10 at the 3 o'clock and 9 o'clock positions. Channel 17 width is such that it permits only lengthwise movements of prying tool 19. Channel 17 depth is equal to split ring 66 bottom coil 70 height (½ the shaft diameter), so that prying tool tip apex 33 (FIGS. 7, 13 and below) can be aligned, prior to coil separation, with groove 71 located between and defined by rounded perimeter 73 of split ring coils 68 and 70. Guidance channels 17 are advantageously offset at an angle from clip holding compartment 10, sloping away from front platform area 40. The angle should be such that no part of prying tools 19 will come close enough to bag bottom edge 13 to damage it, no matter what its position.

each guidance channel 17 having a:

stop box 52, a widened portion of guidance channel 17 that receives and cooperates with stop collar 27 (FIGS. 3, 4, 5) to prevent the prying tool tips 34 from entering interior coil space 54 too far inside split ring 66, and keeps them close to clip holding compartment 10, in position, ready for the next split ring 66. No stop box 52 is needed (FIGS. 2, 20) if alternative stop 28 (FIGS. 12, 13, 14, 15, 21) is used;

Prying Tool 19, one occupying each guidance channel 17; each prying tool 19 comprising a;

rod shaft 21 having a diameter (x) equal to the height of abutted coils 68, 70 of split ring 66 (FIGS. 7, 13);

each rod shaft 21 having at its end nearest to the split ring holding compartment 10 a:

symmetrical tip 34 (FIGS. 3, 10, 12, 21) with back-to-back surfaces 32 (FIGS. 7, 13, 22) that slope at equal angles from full shaft 21 diameter to a blunt knife edge apex 33—like a screw driver with a "cabinet" style (straight sides, no flair) tip, its width x (FIGS. 9, 15) being the same as shaft 21 diameter, which is the distance the coils 68, 70 are to be separated. For example, a shaft diameter/tip width of 4-mm (0.1575) requires a split ring having approximately the same total thickness. The tool tip corners 36 (FIG. 10) are tapered at an angle equal to the offset angle of the guidance channels 17 (FIGS. 1, 2). Unless so tapered, the tip corners would contact and damage edge 13 at bag corner bumps 20 when rotated back into Position 2 just prior to tool withdrawal (see Operation below);

each rod shaft 21 having at its other end a:

handle 44 (FIGS. 3, 4, 5, 12, 21) projecting at a right angle to its shaft 21 axis (not shown) and perpendicular to knife edge apex 33 of tip 34. Handle 44 must be sufficiently long relative to shaft 21 diameter to generate the leverage necessary to pry apart split ring 66 coils 68, 70 (see Operation). Care must be taken in the tool design that handle 44 makes no contact with flat plate 11 or table top or base 80 when in its down position (broken line handle 44);

each rod shaft 21 having at its middle portion a:

stop collar 27 (FIGS. 3, 4, 5) affixed with a set screw 47 inside a threaded hole or a slot cut into the shaft, or a rivet or pin (not shown) that enters a drilled hole;

or alternatively a stop rivet or pin 28 (FIGS. 12, 13, 14, 15, 21) which is affixed to tip 34 at a distance from tip apex 33 such that its contact with coils 68 and 70 prevents the further entrance of prying tool 19 into split ring 66 interior 54. Total rivet or pin 28 length through the tool tip cannot exceed shaft 21 diameter so that it fits snugly into guide channel 17 when in Position 1 (see Operation). Rivet or pin 28 also cooperates with spring strip 56 (FIGS. 12, 13 and below), by preventing excessive outward travel of prying tool 19, thus keeping it in Position 1. Whichever prying tool stop embodiment is most cost effective for a given production run (see Operations) should be selected;

spring strips 56 for:

keeping prying tool tip apex 33 horizontally aligned with parting groove 71 (FIGS. 7, 13) when clip holding compartment 10 contains split ring 66 (Position 1) by pressing against the upward facing flat sloping surface 32 while also causing handles 44 of Prying Tools 19 to point straight up or down (see Operation);

keeping prying tools 19 firmly inside guidance channels 17 by maintaining constant downward pressure, yet yielding upward, thereby allowing shafts 21 to lift when prying tools 19 are pushed by the operator into position 2 (FIGS. 8, 14), and rotated ¼ turn to separate the coils into Position 3 (FIGS. 9, 15);

stopping the outward travel of alternative stop 28 (FIGS. 12, 13).

The Necessity of Suspending Coil Separation Tool 48 (FIGS. 6, 6*a*, 11, 22)

The preferred type of bag disclosed in the applicant's issued U.S. Pat. No. 5,957,354 (entitled Back Sack, trade named Baxac™), as manufactured (FIG. 11), has its bag bottom 16 flat against major upper portion 58, making bag bottom edge 13 inaccessible for attaching split rings 66 at corner bumps 20. To be accessible, edge 13 must be separated from bag upper portion 58 by suspension to form wedge-shaped space 83.

Coil Separating Tool 48 Suspension Bracket(s) 15 (FIGS. 6, 6*a*, 22)

With coil separation tool 48 suspended and occupying wedge-shaped space 83 (FIG. 22), edge 13 can approach its destination to have split rings 66 attached, and provides bag upper portion 58 places to dwell.

A single coil separating tool 48 suspended by bracket 15 cantilevered from one side allows bags to be fed in laterally from the open side. Two brackets, one on each side (not shown) would be sturdier, but permits only vertical bag feeding. Either way, there should be enough lateral space underneath bracket 15 for coil-separating tool 48 to reach both left (FIG. 6*a*) and right (FIG. 6) bag corners 20 without interference of the widest anticipated bag. Otherwise, bracket 15 could be made laterally adjustable to match different bag widths (not shown). When deciding suspension height (vertical space 60), care should be taken to avoid contact between worktable surface or base 80 and tool handles 44 regardless of their position (see Operation).

Alternatively, two short bracket coil separating tools 48 mounted in tandem (not shown), one for each side of the bag, would enable operators to achieve faster assembly cycle times. And if mounted adjustable for distance between them, different bag widths would be accommodated.

Rear Bag Bottom Support 82 (FIGS. 6, 6*a*, 22)

In order for both operators' hands to be free to operate handles 44 of coil separating tool 48 (see Operation), rear bag edge 14 must also be supported. Rear support tube 82 can provide this, as can a duplicate of suspension bracket 15, or the front edge of a low shelf or platform (not shown). Whatever the rear support method, cantilevered mounting (not shown) on the same side as cantilevered bracket 15, or its equivalent, would provide the advantage of a fully open opposite side for easier, unobstructed lateral bag feeding and facilitate the rearward dwelling place option 58.

Operation

POSITION 1 is the loading position. With the help of spring strips 56, the operator points one handle 44 up, the other down, both perpendicular to coils 68 and 70 of split ring 66. If the bag forward position is used (broken lines 59 of FIGS. 6, 6*a*, 22), which handle 44 is up depends on which bag corner is having its split ring 66 attached. The bag and tool handle positions must be coordinated to avoid their making unwanted contact with each other in vertical space 60 underneath coil separating tool 48; specifically, when attaching split ring 66 to the left corner (FIG. 6), the right handle must point up, and vice versa. Coordination is unnecessary if the bag rearward position is used (solid lines 58, FIGS. 6, 6*a*, 22). Both prying tool tips 34 must be outside clip holding compartment 10 in order for it to be loaded. The operator now places a split ring 66 snug and flat into clip holding compartment 10 with the ring's Z-shaped part 72 at the 6 o'clock position (FIG. 3). Prying tool tips 34 will then be correctly poised at the 3 and 9 o'clock positions. Once in Position 1 and loaded, the operator, with open hands, simultaneously strikes the backs of both handles 44 gently, but sharply enough to send tips 34 towards each other (FIG. 3, arrows 35) and into interior coil space 54 as far as their respective stop collars 27, or rivets (or pins) 28 permit (FIGS. 14, 21). This lifts coil 68 partially away from bottom coil 70, which is now safely locked inside clip holding compartment 10 by prying tools 19. Coil separating tool 48 is now in . . .

POSITION 2, ready to overcome the power of the coils for full coil separation, which requires the upward pointed handle 44 to be rotated down 90-degrees (¼ turn) towards the operator (FIG. 5), so that it is horizontal, and downward pointed handle 44 to be rotated up 90-degrees (¼ turn), also towards the operator, so that it, too, is horizontal. Coil-separating tool 48 is now in . . .

POSITION 3 when tool tips 34 are vertical (and the handles horizontal). The coils are now fully separated and ready to receive bag corner bump 20 between them (FIGS. 5, 22). As long as the tips remain perpendicular to the coils in this loaded position, their tremendous energy keeps them secure and stable. This frees the operator to use both hands to feed a bag corner bump 20 into position between open coils 68 and 70.

If coil separation tool 48 is suspended on only one side (FIGS. 6, 6*a*, support 22), bags can be fed in from the opposite open side, or vertically. If two supports 22 are used, one on each side (not shown), only vertical feeding is possible. The operator now directs bag major upper portion 58 either towards him/her self, under bracket 15, to dwell during clip attachment, as in FIGS. 6, 6*a*, and FIG. 22 (broken lines 59), or towards the rear (solid lines), under rear bag support 82.

Once a bag corner bump 20 is in that portion of interior coil space 54 adjacent to front platform area 40 and unoccupied by prying tool tips 34, the operator returns his/her hands to handles 44 and reverses the sequence by rotating them back to Position 2. This allows the coils to partially close on bag corner bump 20, and then the operator pulls handles 44 in opposite directions, out from between the coils and back into Position 1. This allows the coils to fully close on the bag corner bump, thereby capturing it. The bag corner and split ring assembly is then free to be lifted out of the clip holding compartment as a unit.

CONCLUSION, RAMIFICATIONS, & SCOPE

Thus, it is clear that the present split ring coil separating tool and method invention:

Enables both operators' hands to be free for tool and bag handling;

Keeps both prying tool tips ready near their correct insertion points at the split ring coils;

Guides both tool tips towards their correct insertion points at the split ring coils;

Holds the split ring steady hands free while an operator

Forces the tool tips between the coils;

Rotates the coil prying tools ¼ turn;

Forces the coils to separate uniformly across the width of the split ring without the tool tips occupying the space reserved for the bag corners;

Rotates the tools ¼ turn back to its pre-load position;

Withdraws the tool tips from between the coils without damaging the clamped bag corner with its pellet contents;

Releases the split ring with its captured bag corner as a unit;

Remains in position to efficiently accept the next assembly cycle;

Keeps the split rings stable and safe while performing its specified tasks.

Although the above description sets forth specific embodiments of the invention, it should not be construed as limitations on its scope. Many variations are possible. For example, the split ring coils 68 and 70 could be separated by different prying techniques, such as steel wedges (FIG. 23) that enter between the coils and exit without the need for rotation. Such wedge tips would permit various coil separation distances depending on how far they enter between the coils, and thus accommodate different split ring sizes. Or, instead of the prying tools being operated manually, they would be moved by mechanical means, such as solenoids or actuators. And they could be triggered by optical, or other type sensors, so that when an operator gets close to the split ring with a bag corner (or the like), the coils would separate automatically and close when its destination is reached. Or, the prying tools could be operated via mechanical linkage, with or without electric, pneumatic, or air assist by an operator's foot or knee, so their hands are always free. The split ring holding compartment could be a modified flange attached to a flat plate, and the guidance channels could be defined by angle strips similarly attached. An alternate way to spread the coils utilizes very coarse threaded sheet metal type screws, which taper to a sharp point. The more turns of the screw, the further apart the coils are separated. The shape of the split rings could vary, such as having one or more straight sides, or more than two prying tools might be needed, not only to accommodate different split ring shapes, but to facilitate the entrance between the coils of two or more material packets with pellets folded within approaching the split rings from different sides. Such an embodiment could find use in the fashion industry, for example, where the split rings would be valued as being both decorative and functional. A hand-held embodiment designed to operate with only one hand could be used in the field for attaching banners and other displays. This embodiment would enable an operator to move the tool towards the fixed in place pellet-loaded material instead of the reverse, as described above.

Accordingly, the scope of the invention should be determined not by the embodiments presented herein, but by the appended claims and their legal equivalents.

What is claimed is:

1. A device for moving a pair of coils of a highly-biasable split ring lock from an unbiased clamping mode into a biased unclamped mode and further for releasing said pair of coils from said biased unclamped mode into said unbiased clamped mode, said pair of coils including a top and bottom coil defining a parting groove therebetween and also defining a locking chamber, the ring lock being for gripping a flexible material with a gripable means positioned in said locking chamber, said device comprising support means for holding said split ring lock wherein one of the coils of said pair of coils is positioned within said support means, means for prying apart said pair of coils at said parting groove from said unbiased mode into said biased unclamped mode and for releasing said pair of coils from said biased unclamped mode into said unbiased clamped mode, means for guiding said means for prying and for releasing to and from said pair of coils, said means for guiding being associated with said support means, and means for holding down said at least one means for prying and releasing said support means for holding.

2. The device in accordance with claim 1, wherein said support means for holding is a support plate having a flat top surface, said support plate defining a coil ring holding compartment, wherein the other of the coils of said pair of coils is positioned above said flat top surface and said parting groove is aligned with said flat top surface.

3. The device in accordance with claim 2, wherein said holding compartment includes a cylindrical wall and a bottom wall parallel to said flat top surface, said cylindrical wall having a cylindrical wall height between said bottom wall and said plate flat top surface, said holding compartment having a holding compartment diameter measured across said cylindrical wall, and wherein each of said pair of coils of said split ring lock has a split ring outer diameter that is generally equal to said holding compartment diameter and each of said pair of coils has a coil thickness that is generally equal to said cylindrical wall height.

4. The device in accordance with claim 2, wherein said means for prying and releasing said pair of coils includes at least one linear rod having opposed inner and outer ends, said inner end having a linear screwdriver tip front edge for alignment with said parting groove of said coils and with said flat top surface of said support plate, said at least one linear rod being circular in cross-section and having a taper leading to said linear front edge, said at least one linear rod being axially movable between an inactive position and an active position, wherein in said inactive position said linear front edge is remote from said holding compartment and in said active position said linear front edge is positioned within said holding compartment.

5. The device in accordance with claim 4, wherein said at least one rod is rotatable between a first rotatable position and a second rotatable position wherein in said first rotatable position said at least one rod is in said inactive position and said linear front edge is horizontal and wherein in said second rotatable position said at least one rod is in said active position and said linear front edge being generally vertical.

6. The device in accordance with claim 5, further including a lever arm positioned at said outer end of said at least one linear rod, said lever arm being generally transverse to said at least one linear rod, said at least one linear rod being rotatable between said first and second rotatable positions by operation of said lever arm wherein said at least one linear rod is rotatable between said first and second rotatable positions.

7. The device in accordance with claim 6, wherein said support plate includes a support plate edge and wherein said at least one linear rod is cylindrical and wherein said means for guiding includes said support plate defining at least one linear guide channel extending between said support plate edge and said holding compartment, said at least one rod being rotatably and slidably positioned in said guide channel.

8. The device in accordance with claim 7, wherein said at least one linear rod includes another linear rod and said support plate defining another linear guide channel, said another linear rod being rotatably and slidably positioned in said another linear guide channel, said at least one linear rod and said another linear rod being positioned in a generally opposed relationship.

9. The device in accordance with claim 8, further including means for limiting linear movement of said at least one linear rod when said at least one linear rod is in said active position.

10. The device in accordance with claim 9, wherein said means for limiting includes said support plate defining a cavity in communication with said at least one linear guide channel, said at least one cavity defining a front stop wall, and wherein said means for limiting further includes a collar mounted to said at least one linear rod, wherein in said active position of said at least one rod said collar is in contact with said front stop wall.

11. The device in accordance with claim 10, wherein said means for limiting includes said support plate defining another cavity in communication with said second linear guide channel, said another cavity defining a second front stop wall, and further wherein said means for limiting further includes a second collar mounted to said another linear rod, wherein in said active position of said another linear rod said second collar is in contact with said second front stop wall.

12. The device in accordance with claim 9, further including means for limiting in said active position, said means for limiting in said active position including a forward stop pin secured to said at least one linear rod wherein when said at least one linear rod has reached said active position said forward stop pin makes contact with at least one of said coils.

13. The device in accordance with claim 9, wherein said means for limiting is in said active position further includes another linear rod having another forward stop pin secured thereto wherein when said another linear rod has reached said active position said another forward stop pin makes contact with at least one of said coils.

14. The device in accordance with claim 8, further including means for limiting linear movement of said at least one linear rod when said at least one linear rod is in said inactive position.

15. The device in accordance with claim 14, wherein said means for limiting in said inactive position includes said support plate defining at least one cavity in communication with said at least one linear guide channel, said at least one cavity defining a rear stop wall, and wherein said means for limiting further includes a collar mounted to said at least one linear rod, wherein in said active position of said at least one rod said collar is in contact with said rear stop wall.

16. The device in accordance with claim 15, wherein said means for limiting in said inactive position further includes said support plate defining a second cavity in communication with said second linear guide channel, said second cavity defining a second rear stop wall and further including a second collar mounted to said another linear rod, wherein in said active position of said another linear rod said second collar is in contact with said second rear stop wall.

17. The device in accordance with claim 16, wherein said means for holding down includes a biasable strip having opposed ends, one of said ends being secured to said support plate and the other of said ends being vertically movable, said other of said ends of said strip and said top surface of said guide channel defining a space therebetween, said at least one linear rod being positioned in said space, said other of said ends of said biasable strip being vertically movable between an unbiased mode and a biased mode wherein when said at least one linear rod is in said first rotatable position said other end of said biasable strip is in said unbiased mode and when said at least one linear rod is in said second rotatable position said other end of said biasable strip is in said biased mode.

18. The device in accordance with claim 17, wherein said at least one linear rod includes said another linear rod and wherein said means for holding down includes a second biasable strip having opposed ends, one of said ends being secured to said support plate and the other of said ends being vertically movable, said second biasable strip and said top surface of said support plate defining another space therebetween, said another linear rod being positioned in said another space, said other of said ends of said second biasable strip being vertically movable between an unbiased mode and a biased mode wherein when said another linear rod is in said first rotatable position said other end of said second biasable strip is in said unbiased mode and when said another linear rod is in said second rotatable position said other end of said second biasable strip is in said biased mode.

19. The device in accordance with claim 18, wherein said means for limiting linear movement in said inactive position includes a rearward stop pin secured to said at least one linear rod wherein when said at least one linear rod has reached said inactive position said rearward stop pin makes contact with said biasable strip.

20. The device in accordance with claim 19, wherein said means for limiting in said inactive position further includes said another linear rod having another rearward stop pin secured thereto wherein when said another linear rod has reached said inactive position said another rearward stop pin makes contact with said second biasable strip.

21. A stitchless method for a coil separating tool for attaching split rings to foldable flexible materials, the separating tool including:

(a) a split ring comprising a top and bottom coil connected to each other by a Z-shaped portion, said coils' strong contact relationship defining an exterior parting groove and an interior locking chamber;

(b) a split ring holding compartment centered on a flat plate;

(c) at least one prying tool comprising a cylindrical rod shaft having a symmetrical slot screwdriver type linear tip inner end having a width similar to said cylindrical rod shaft;

a lever outer end for sliding said prying tool axially and rotating said prying tool around its axis;

a middle shaft portion;

a flat surface portion on said shaft parallel to said linear tip, (d) at least one stopping means affixed to said middle shaft portion, said prying tool being in its first position when said tip is pointing at, remote from, and adjacent to said holding compartment, (e) at least one guidance means associated with said flat plate and axially aligned with and slidably guiding each said prying tool, (f) at least one stopping means cooperating with said stopping means affixed to said prying tool and associated with said guiding means, and (g) at least one spring strip affixed at its one end to said flat plate, at its other end yieldably holding each said prying tool snugly within and axially aligned with said guidance means and in cooperation with said prying tool flat surface portion aligning said linear screwdriver tip with said split ring parting groove when said prying tool is in its said first position and when a split ring is in said holding compartment, the method including the steps of:

(a) placing a split ring into said holding compartment oriented with its Z-shaped portion away from said prying tool tips (b) pushing said lever ends of said prying tools outer ends towards said split ring parting groove a distance defined by said stopping means, sending said tool tips into a second position between said top and bottom coils thereby partially separating them (c) rotating each said lever outer end of said prying tools 90-degrees on its said axis simultaneously in opposite clock directions thereby setting both said tool tips vertically and perpendicular to said top and bottom coils into a third position and fully separating said top and bottom coils to a distance equal to said screwdriver tips width (d) inserting a pellet-sized gripable object into the fold of said foldable material thereby forming a bump sandwich (e) sliding the folded material bump sandwich between said fully separated top and bottom coils and into said locking chamber of said split ring (f) rotating each said lever outer ends 90-degrees simultaneously in opposite clock directions around said axis back into said second position thereby partially trapping said folded material bump sandwich between said coils within said locking chamber; and (g) pulling said prying tools by said lever outer ends simultaneously out from between said top and bottom coils back and away from said split ring and said holding compartment a distance defined by said stopping means causing said coils to fully close thereby trapping said folded material bump sandwich in said locking chamber, releasing the ring lock together with its entrapped material bump sandwich and allowing their removal as a unit from said holding compartment of said coil separating tool, and said prying tools being again in said first position ready for the next cycle.

* * * * *